United States Patent
Osawa et al.

(10) Patent No.: US 9,772,178 B2
(45) Date of Patent: Sep. 26, 2017

(54) OPTICAL MEASURING DEVICE

(71) Applicant: Hitachi-LG Data Storage, Inc., Tokyo (JP)

(72) Inventors: Kentaro Osawa, Tokyo (JP); Hiroyuki Minemura, Tokyo (JP); Yumiko Anzai, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 15/208,686

(22) Filed: Jul. 13, 2016

(65) Prior Publication Data

US 2017/0059300 A1 Mar. 2, 2017

(30) Foreign Application Priority Data

Aug. 26, 2015 (JP) .................. 2015-166973

(51) Int. Cl.
*G01B 9/02* (2006.01)
(52) U.S. Cl.
CPC .................. *G01B 9/02091* (2013.01)
(58) Field of Classification Search
CPC ............ G01B 9/02034; G01B 9/02035; G01B 9/02038; G01B 9/02042; G01B 9/0209; G01B 9/02091
See application file for complete search history.

(56) References Cited

U.S. PATENT DOCUMENTS

| | | | |
|---|---|---|---|
| 6,243,199 B1 | 6/2001 | Hansen et al. | |
| 8,497,934 B2 * | 7/2013 | Milnes | G02B 27/22 348/363 |
| 8,797,545 B2 * | 8/2014 | Hirose | A61B 3/102 356/497 |
| 2007/0206200 A1 * | 9/2007 | Lindner | G01B 11/2441 356/511 |
| 2012/0300217 A1 | 11/2012 | Yuasa | |
| 2014/0204388 A1 | 7/2014 | Osawa et al. | |

FOREIGN PATENT DOCUMENTS

| | | |
|---|---|---|
| JP | 2003-508813 A | 3/2003 |
| JP | 2015-084965 A | 5/2015 |

\* cited by examiner

*Primary Examiner* — Jonathan Hansen
(74) *Attorney, Agent, or Firm* — Mattingly & Malur, PC

(57) ABSTRACT

Provided is an optical measuring device that can realize a wide measurement region without an increase in the measurement time or a reduction in the measurement region while avoiding damage to a measurement target due to excessive light exposure, using a simple configuration. The device includes a light source, an optical splitting unit configured to split a light beam emitted from the light source into a signal beam and a reference beam, an objective lens configured to focus the signal beam and irradiate a measurement target with the signal beam, a scanning unit configured to move the focus position of the signal beam, an optical element having lower transmissivity in its peripheral portion than in its central portion, interference optics configured to combine the reference beam with the signal beam reflected or scattered by the measurement target, thereby generating interference beams, and photodetectors configured to detect the respective interference beams.

15 Claims, 16 Drawing Sheets

OPTICAL MEASURING DEVICE

CLAIM OF PRIORITY

The present application claims priority from Japanese patent application JP 2015-166973 filed on Aug. 26, 2015, the content of which is hereby incorporated by reference into this application.

BACKGROUND

Technical Field

The present invention relates to an optical image measuring device for observing a measurement target using interference of light beams.

Background Art

In recent years, optical coherence tomography (OCT) has been drawing attention as a technology that can visualize the internal structure of a measurement target using interference of light beams. OCT has been widely used for funduscopy, and has been used to diagnose a variety of eye diseases. In recent years, the range of the application of OCT has expanded to a variety of fields, such as dermatology, cardiology, odontology, oncology, and food industry.

In OCT, as described in Patent Document 1, for example, a light beam from a light source is split in two that are a signal beam to irradiate a measurement target and a reference beam to be reflected by a reference beam mirror without irradiating the measurement target. The signal beam reflected by the measurement target is combined with and thus is caused to interfere with the reference beam, so that an interference signal is obtained.

OCT is broadly divided into time domain OCT and Fourier domain OCT depending on the method of moving the measurement position in the optical axis direction (hereinafter referred to as z-scan). In time domain OCT, z-scan is performed by using a low coherence light source as a light source and moving a reference beam mirror during measurement. Accordingly, only the components in a signal beam that have the same optical path length as the reference beam will interfere with the reference beam. Performing envelope detection on the obtained interference signal can obtain a desired signal through demodulation. Meanwhile, Fourier domain OCT is further divided into wavelength-scanning OCT and spectral domain OCT. In wavelength-scanning OCT, z-scan is performed by using a wavelength-scanning light source capable of causing the wavelength of an emitted beam to scan, and causing the wavelength to scan during measurement. Performing Fourier transform on the wavelength dependence of the detected interference beam intensity (i.e., an interference spectrum) can obtain a desired signal. In spectrum domain OCT, using a broadband light source for a light source, splitting a generated interference beam with a spectroscope, and detecting the interference beam intensity for each wavelength component (i.e., an interference spectrum) correspond to the z-scan. Performing Fourier transform on the obtained interference spectrum can obtain a desired signal.

RELATED ART DOCUMENTS

Patent Documents

Patent Document 1: US 2012/0300217 A1
Patent Document 2: US 2014/0204388 A1
Patent Document 3: JP 2015-084965 A
Patent Document 4: JP 2003-508813 A

SUMMARY

In OCT, the position of a measurement target on which a signal beam is focused is moved using a scanning element, such as a galvanometer mirror, so that signals from different positions of the measurement target are acquired. Such a method has a problem in that the scanning speed becomes slow at a return position of moving the focus position (i.e., a return position of scanning), and thus that the amount of light exposure at that position becomes large, which can damage the measurement target. As a method that can obviously prevent such damage to the measurement target, there is known a method of blocking laser in a region around a return position of moving the focus position (i.e., a return position of scanning) and thus excluding such region from the measurement region. However, such a method has a problem in that the measurement region becomes small. The measurement region can be increased by increasing the drive range of the scanning element. However, the drive range of the scanning element typically becomes smaller as the drive frequency is increased. That is, in order to increase the drive range, it is necessary to lower the drive frequency, which is problematic in that the measurement time becomes long.

The aforementioned problems will be specifically described referring to an optical measuring device described in Patent Document 2 as an example. In the optical measuring device, the focus position is moved by moving the position of an objective lens, and an actuator is used as a scanning element. FIG. 1 is a chart showing the typical frequency characteristics of the drive amplitude of the actuator used for the optical measuring device. As the amplitude when the actuator is driven at the resonance frequency is the largest, it is possible to obtain the largest measurement region when the actuator is driven at the resonance frequency. Meanwhile, in order to shorten the measurement time, it is necessary to drive the actuator at as high a frequency as possible. Thus, the actuator is preferably driven at as high a frequency as possible within the range that a necessary width of a measurement region is obtained. The size of a necessary measurement region differs depending on the structural period of a measurement target or the objective of the measurement. Hereinafter, description will be made on the assumption that a measurement region has a size of 0.5 mm×0.5 mm. In principle, a measurement region with a size of 0.5 mm×0.5 mm can be secured as long as the actuator can be driven by 0.5 mm. In the case of an actuator with the frequency characteristics shown in FIG. 1, the maximum frequency at which the actuator can be driven by 0.5 mm is about 100 Hz. For example, provided that signals are obtained by scanning a measurement region through 500 times of reciprocation, the measurement time is 5 seconds at the shortest. However, as described previously, if laser is blocked in a region around a return position of moving the focus position (i.e., a return position of scanning) to prevent damage to a measurement target, it is necessary to drive the actuator by a distance of greater than 0.5 mm.

Herein, as a simple example, suppose a case where the actuator is driven with a sine wave, and laser is blocked in a region around a return position of scanning other than the linear drive region of the actuator (i.e., a region where the speed can be regarded as generally constant). FIG. 2 is a chart showing the relationship between a time and the position of the objective lens driven by the actuator when the actuator is driven with a sine wave with a frequency of 100 Hz. Provided that a region where the difference from an approximate straight line at a time when the speed is the maximum is within 5% is defined as a linear drive region, the size of the linear drive region is about 50% that of the amplitude. Thus, in such a case, it is necessary to drive the actuator by 1 mm to secure a measurement region with a size of 0.5 mm×0.5 mm. From FIG. 1, it is seen that the maximum frequency at which the actuator can be driven by 1 mm is about 60 Hz, and the measurement time in this case is 8.3 seconds at the shortest, which is longer than the measurement time when laser is not blocked by about 1.67 times. As described above, when laser is blocked at a return position of scanning to prevent damage to a measurement target due to excessive light exposure, the measurement time can increase or the measurement region can become smaller.

In the optical measuring device described in Patent Document 2, the intensity of a laser beam that irradiates a measurement target is reduced or set zero in a region around a return position of scanning where the scanning speed becomes slow, so that damage to the measurement target is avoided. Even in the ophthalmic laser surgery device described in Patent Document 3, the energy of a pulsed laser beam that is focused onto body tissue is adjusted such that the energy is lowered as the scanning speed is decreased, so that damage to body tissue is suppressed. However, the inventions described in Patent Documents 2 and 3 have problems in that the measurement region becomes small or complex laser control that is synchronous with the scanning element is necessary.

The present invention has been made in view of the foregoing problems, and it is an object of the present invention to provide an optical measuring device that can realize a wide measurement region without an increase in the measurement time or a reduction in the measurement region while avoiding damage to a measurement target due to excessive light exposure, using a simple configuration.

An optical measuring device provided by a typical embodiment includes a light source, an optical splitting unit configured to split a light beam emitted from the light source into a signal beam and a reference beam, irradiation optics configured to irradiate a measurement target with the signal beam, a scanning unit configured to repeatedly move the focus position of the signal beam on the measurement target, interference optics configured to combine the reference beam with the signal beam reflected by or scattered by the measurement target, thereby generating interference beams, and photodetectors configured to detect the respective interference beams. The irradiation optics include arranged therein an optical element whose transmissivity is lower in its peripheral portion than in its central portion. The signal beam irradiates the measurement target after having passed through the optical element. Specifically, the transmissivity of the optical element has a distribution in the axis direction of the repeated scanning performed by the scanning unit.

According to the present invention, there is provided an optical measuring device that can realize a wide measurement region while avoiding damage to a measurement target due to excessive light exposure, using a simple configuration.

Other problems, configurations, and advantageous effects will become apparent from the following description of embodiments.

DETAILED DESCRIPTION

Hereinafter, embodiments of the present invention will be described with reference to the accompanying drawings.

Embodiment 1

Figure 3:
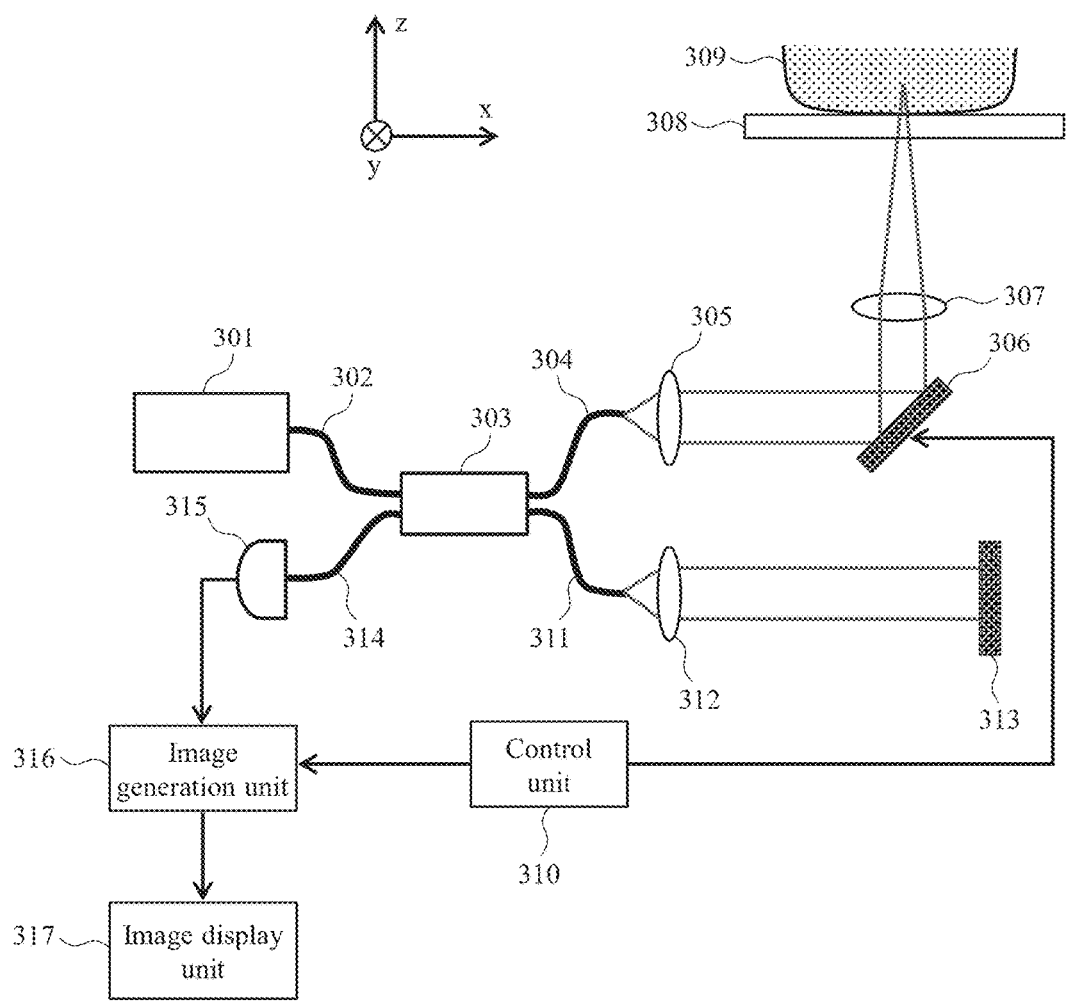
FIG. 3 is a schematic view showing an exemplary configuration of an optical measuring device.

FIG. 3 is a schematic view showing an exemplary configuration of an optical measuring device in accordance with the present invention.

A light beam emitted from a broadband light source 301 propagates through an optical fiber 302, and is then split in two, which are a signal beam and a reference beam, by an optical coupler 303. The signal beam propagates through an optical fiber 304, and is then emitted to a space and is converted into collimated beams by a collimating lens 305. The collimated beams converted from the signal beam are reflected by a galvanometer mirror 306, which are then focused by an objective lens 307, pass through an optical filter 308, and then irradiate a measurement target 309. At this time, the power of the signal beam that irradiates the measurement target is adjusted to an appropriate value in accordance with the focus position by passing through the optical filter 308. The optical filter 308 is arranged as close as possible to the focus position, that is, arranged so as to contact the measurement target in order to suppress a change in the spatial intensity distribution of the signal beam. The angle of the galvanometer mirror 306 is controlled by a control unit 310. When the angle of the galvanometer mirror 306 is changed, the focus position of the signal beam on the measurement target is moved in the direction (i.e., x-direction) perpendicular to the optical axis direction (i.e., z-direction) of the signal beam. The signal beam reflected or scattered by the measurement target is again guided to the optical coupler 303 through the optical filter 308, the objective lens 307, the galvanometer mirror 306, the collimating lens 305, and the optical fiber 304.

Meanwhile, the reference beam propagates through an optical fiber 311, and is then emitted to a space and is converted into collimated beams by a collimating lens 312. The collimated beams converted from the reference beam are reflected by a mirror 313, and are again guided to the optical coupler 303 through the collimating lens 312 and the optical fiber 311. The signal beam and the reference beam are combined by the optical coupler 303, so that an interference beam is generated. A part of the interference beam propagates through an optical fiber 314, and is guided to a spectroscope 315. In the spectroscope 315, an interference beam intensity (i.e., an interference spectrum) of each wavelength component is generated as an electric signal, which is then sent to an image generation unit 316. The image generation unit 316 generates an image based on the electric signal, and displays the image on an image display unit 317.

Hereinafter, the role and the transmissivity distribution of the optical filter 308 will be described. The transmissivity of the optical filter 308 is uniform in the direction (i.e., y-direction) that is perpendicular to each of the optical axis direction (z-direction) and the direction (x-direction) of repeatedly moving the focus position (i.e., scanning) with the galvanometer mirror 306, and the transmissivity of the optical filter 308 in the x-direction is lower in its peripheral portion than in its central portion. Herein, the central portion of the optical filter 308 indicates the central portion of a region of the optical filter 308 through which a signal beam passes when the focus position of the signal beam is moved by the galvanometer mirror 306. Accordingly, it is possible to reduce the exposure amount in an area around a return position of repeated scanning where the scanning speed becomes slow, and thus suppress damage to the measurement target.

Hereinafter, the function of the optical filter 308 will be described using mathematical formulae. Provided that the power of the signal beam immediately before it becomes incident on the optical filter 308 after having passed through the objective lens 307 is P, the focus position of the signal beam on the measurement target at a time t is x(t), the radius of the spot of the signal beam at the focus position is w, and the transmissivity of the optical filter when the focus position of the signal beam is x is T(x), the exposure amount Ex(x) of the measurement target can be approximately represented as follows.

$$Ex(x) = \frac{PT(x)}{\pi \omega^2} \frac{2\omega}{dx(t)/dt} \qquad \text{[Formula 1]}$$

Herein, $PT(x)/\pi\omega^2$ represents the irradiation power density, and $2/dx(t)/dt$ represents the exposure time. When the galvanometer mirror 306 is driven with a sine wave, x(t) is represented as follows.

$$x(t) = \frac{A}{2}\sin(2\pi f_x t) \qquad \text{[Formula 2]}$$

Herein, $f_X$ represents the drive frequency of the galvanometer mirror 306, and A represents the amplitude of a change in the focus position in accordance with a change in the angle of the galvanometer mirror 306. Substituting Formula 2 into Formula 1 can obtain the following formula related to the spatial distribution of the exposure amount.

$$Ex(x) = \frac{PT(x)}{\pi \omega^2} \frac{2\omega}{\pi A f_x \cos(2\pi f_x t)} \qquad \text{[Formula 3]}$$

Formula 3 is calculated using approximation. Therefore, when at least T(x) is a constant (i.e., when the optical filter 308 is not used), the exposure amount formally diverges, but the actual exposure amount does not diverge even at a return position of scanning. However, the tendency of the actual exposure amount is generally represented by Formula 3, and the exposure amount is rapidly increased generally in reverse proportion to the scanning speed at a position closer to a return position of scanning.

Figure 4:
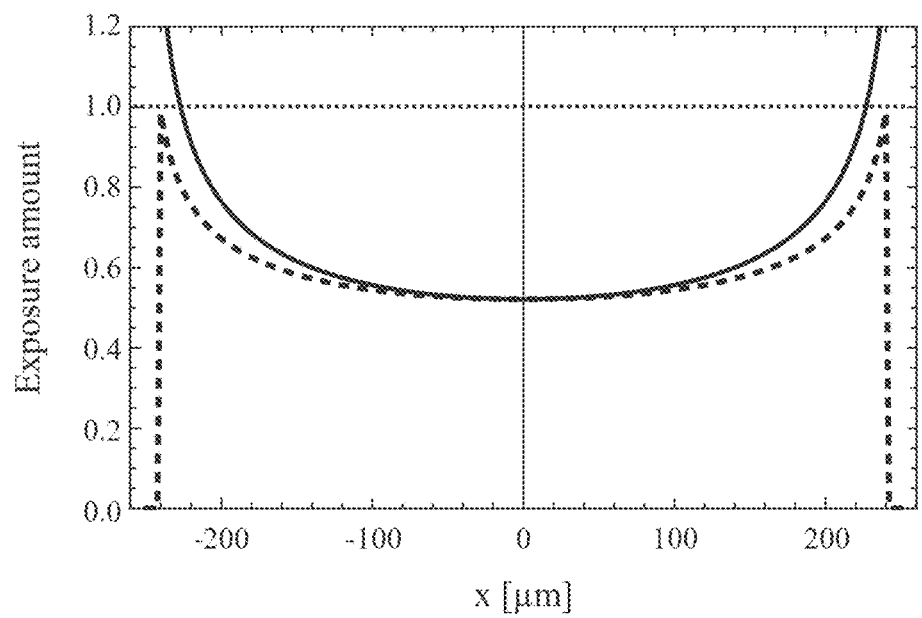
FIG. 4 is a chart showing an example of the exposure amount distribution of a measurement target.

FIG. 4 is a chart showing an example of the exposure amount distribution of a measurement target. The solid line represents an example of the spatial distribution of the exposure amount in the x-direction when the optical filter 308 is not used. The values of parameters used for the calculation are P=0.1 mW, $f_x$=120 Hz, A=500 μm, and ω=0.75 μm. As a measurement target, skin of a human is supposed, and the exposure amount is standardized using the MPE (Maximum Permissible Exposure) of skin at a wavelength of 785 nm that is defined by JIS C6802. That is, there is a risk that a measurement target may become damaged if the exposure amount is greater than or equal to 1. As described above, when the optical filter 308 is not used, the exposure amount in a region around a return position of scanning is above the reference value (MPE), and thus, there is a risk that a measurement target may become damaged. Thus, in this embodiment, the optical filter 308 is provided with a transmissivity distribution represented by the following formula, for example. That is, the optical filter 308 is provided with a transmissivity distribution that is proportional to the fourth root of the moving speed dx(t)/dt of the focus position of the signal beam.

$$T(x) = \qquad \text{[Formula 4]}$$
$$\begin{cases} \left(\frac{|dx(t)/dt|}{dx(0)/dt}\right)^{1/4} = |\cos(2\pi f_x t)|^{1/4} = \left|1 - \left(\frac{2}{A}x\right)^2\right|^{1/8} & (|x| < x_c) \\ 0 & (|x| > x_c) \end{cases}$$

Herein, $x_c$ is the position where the exposure amount coincides with the MPE when the optical filter 308 is used whose transmissivity for all x is given by T(x) of Formula 4 where x<$x_c$.

Figure 5:
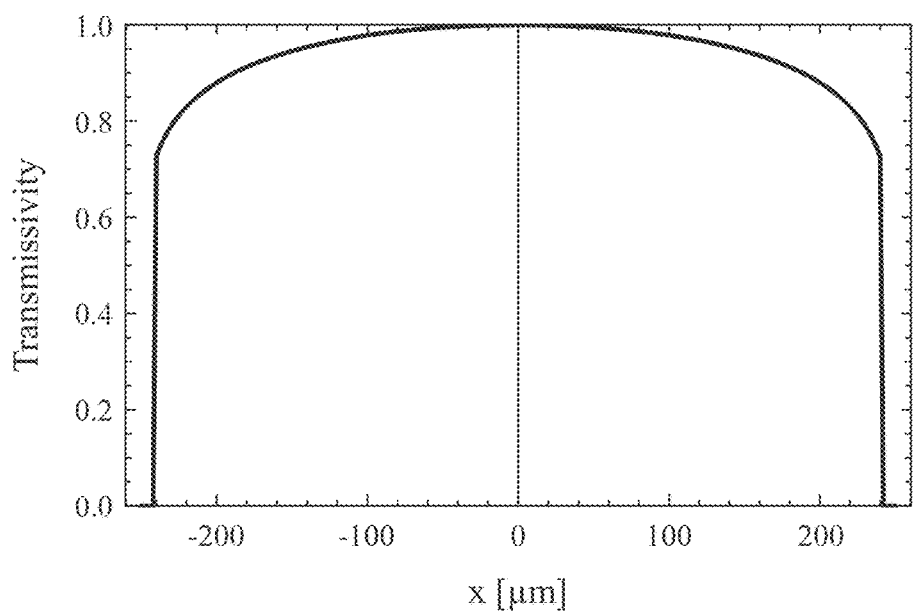
FIG. 5 is a chart showing an example of the transmissivity distribution of an optical filter.

FIG. 5 shows the transmissivity distribution of Formula 4. As shown in FIG. 5, the optical filter has a transmissivity distribution such that the transmissivity gradually increases at positions closer to the central portion than at the peripheral portion of the filter. The dashed line in FIG. 4 shows the spatial distribution of the exposure amount when the optical filter 308, which has the transmissivity distribution represented by Formula 4, is used. In this case, it is seen that the exposure amount is below the MPE in all regions. As described above, in this embodiment, damage to a measurement target can be avoided with a simple configuration.

As another method for avoiding damage to a measurement target, there is a method of blocking laser in a region where the exposure amount may exceed the reference value and thus excluding such region from the measurement region. However, such a method has problems in that complex laser control that is synchronous with a scanning element is necessary, and the measurement region becomes smaller. In this embodiment, laser control that is synchronous with a scanning element is not necessary. Further, as the irradiation light power gradually becomes lower at positions closer to a return position of scanning, it is possible to expand the measurement possible region (i.e., a region where the exposure amount is less than or equal to the MPE and the transmissivity of the filter is greater than or equal to zero) than those of the conventional optical measuring devices.

In the example shown in FIG. 4, the measurement possible region is expanded from about 454 μm to about 481 μm with the application of the optical filter 308. Meanwhile, as another method for expanding the measurement possible region, there is also a method of increasing the drive range of the scanning element. However, the drive range of the scanning element typically becomes smaller as the drive frequency is increased. That is, in order to increase the drive range, it is necessary to lower the drive frequency, which is problematic in that the measurement time becomes long. In this embodiment, the measurement possible region can be expanded without expanding the drive range by lowering the drive frequency of the scanning element. This also contributes to increasing the measurement speed.

Next, the S/N ratio of a signal of each pixel of a tomographic image that is obtained with the optical measuring device in this embodiment will be described. The number of samplings ($N_{sampling}$) of data per pixel of an image is given by the following formula.

$$N_{sampling}(x) = f_{sampling} \frac{L_{pixel}}{|dx(t)/dt|} \quad \text{[Formula 5]}$$

Herein, $f_{sampling}$ represents the sampling frequency, and $L_{pixel}$ represents the length of the actual scale corresponding to one pixel.

Provided that the luminance value of each pixel is set such that it becomes proportional to the average value of the sampled data, the S/N ratio of a signal of each pixel becomes proportional to the square root of $N_{sampling}$ due to the noise-reducing effect of averaging. Accordingly, the S/N ratio of a signal of each pixel can be given by the following formula. Herein, α is a coefficient of proportionality.

$$SNR(x) = \alpha T(x)^2 \sqrt{N_{sampling}(x)} \quad \text{[Formula 6]}$$

From Formula 6, it is seen that when $T(x)$ is a constant (i.e., when the optical filter 308 is not used), the S/N ratio of a signal of each pixel of an image differs depending on the position x of the pixel, and thus has a distribution. Specifically, at a position closer to a return position of scanning where the scanning speed becomes slow, the number of samplings per pixel ($N_{sampling}$) is higher, and the S/N ratio is thus higher. In such a case, the sharpness of the structure of the imaged measurement target differs from region to region of the image. Thus, there may be cases where the obtained image does not correctly reflect the structure of the original measurement target.

Substituting Formulae 4 and 5 into Formula 6 can obtain the S/N ratio of a signal of each pixel when the optical filter 308 is used.

$$SNR(x) = \alpha \left(\frac{|dx(t)/dt|}{dx(0)/dt}\right)^{1/2} \left(f_{sampling} \frac{L_{pixel}}{|dx(t)/dt|}\right)^{1/2} = \alpha \left(f_{sampling} \frac{L_{pixel}}{\pi A f_x}\right)^{1/2} \quad \text{[Formula 7]}$$

From Formula 7, it is seen that due to the effect of the transmissivity distribution provided to the optical filter 308, the S/N ratio of a signal of each pixel becomes constant regardless of the position of the pixel. Accordingly, in this embodiment, the sharpness of the structure of the imaged measurement target becomes constant in any region of the image, and thus, an image that correctly reflects the structure of the measurement target can be obtained.

Although the optical filter 308 whose transmissivity is given by Formula 4 is used in this embodiment, similar effects can be obtained as long as a filter whose transmissivity is lower in its peripheral portion than in its central portion is used, and this embodiment is not limited to an optical measuring device with the optical filter 308 having the transmissivity distribution represented by Formula 4.

Figure 6A:
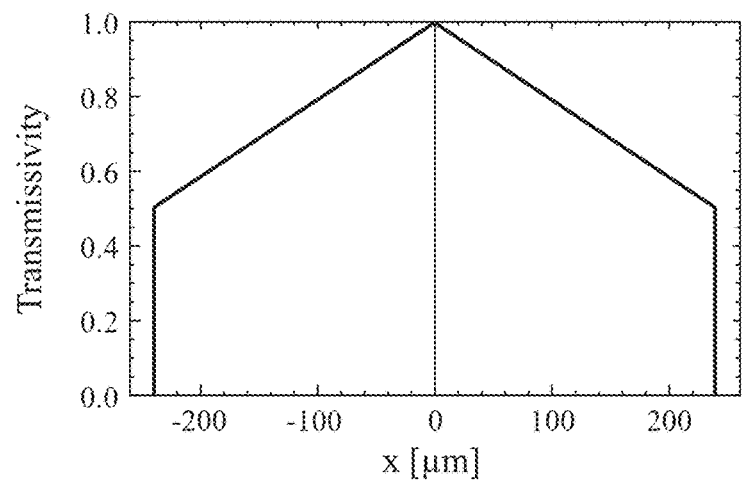
FIGS. 6A to 6C are charts each showing an example of the transmissivity distribution of an optical filter.
Figure 6B:
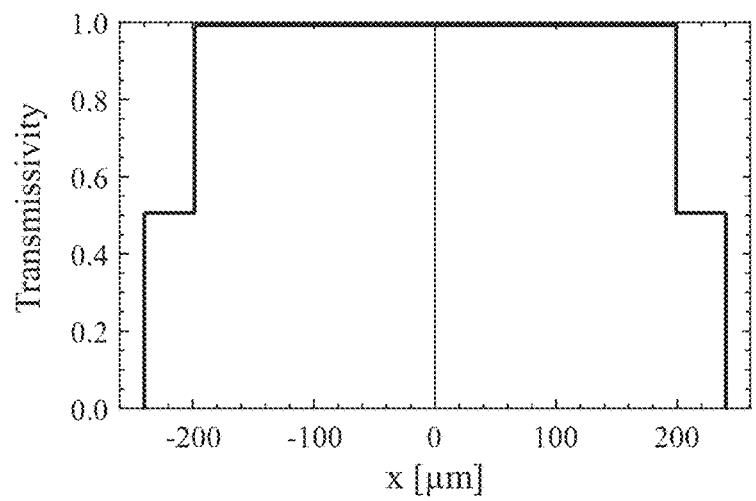
Figure 6C:
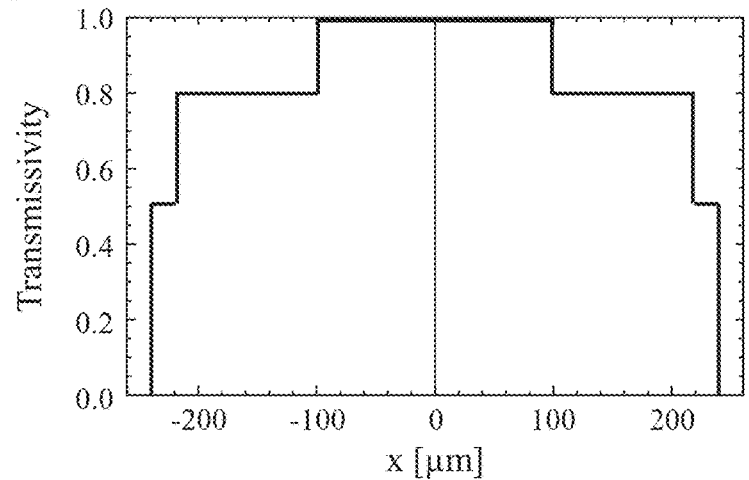

FIGS. 6A to 6C are charts each showing another example of the transmissivity distribution of the optical filter 308. An optical filter whose transmissivity distribution linearly changes spatially as shown in FIG. 6A and an optical filter whose transmissivity distribution changes in stages as shown in FIGS. 6B and 6C have advantages in that such optical filters can be produced more easily than an optical filter with the transmissivity distribution represented by Formula 4.

Finally, an exemplary structure of the optical filter 308 and a method for producing the filter will be described.

Figure 7A:
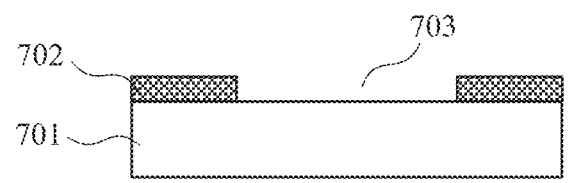
FIGS. 7A and 7B are schematic views each showing an exemplary structure of an optical filter.
Figure 7B:
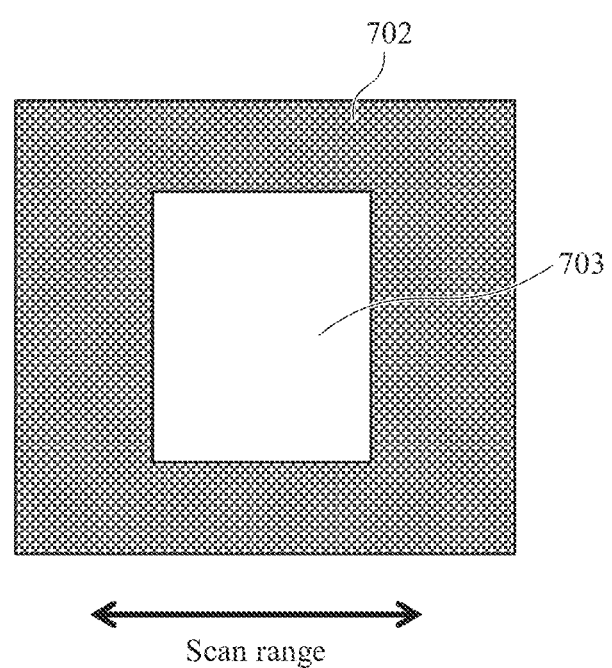

FIGS. 7A and 7B are schematic views each showing an exemplary structure of the optical filter 308. FIG. 7A is a cross-sectional schematic view and FIG. 7B is a plan schematic view. The optical filter is obtained by providing a light-blocking portion 702 with low transmissivity to the peripheral portion of a transparent substrate 701. The optical filter has a structure in which the light-blocking portion 702 has an opening 703 in its central portion and thus has high transmissivity in the central portion.

Figure 8A:
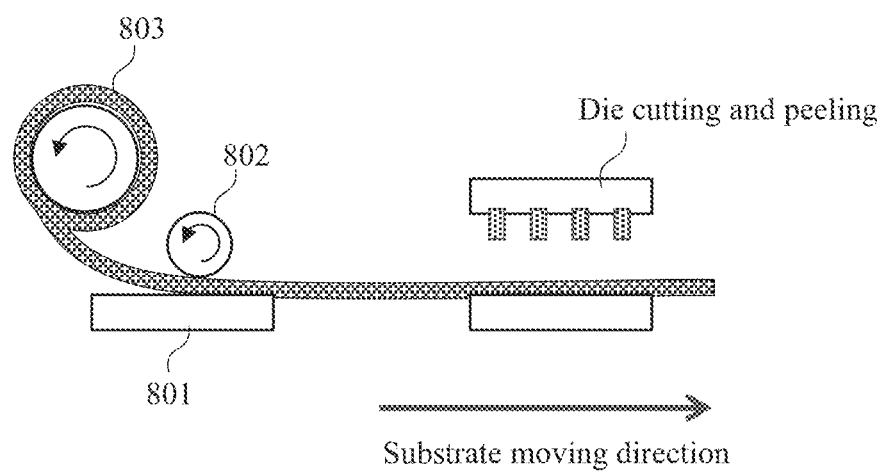
FIGS. 8A and 8B are schematic views illustrating a method for producing an optical filter.
Figure 8B:
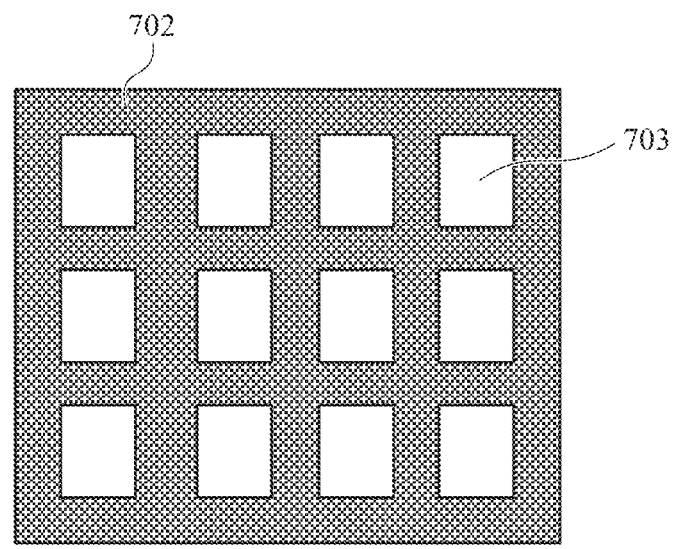

FIGS. 8A and 8B are schematic views each illustrating the production method. As shown in the cross-sectional schematic view of FIG. 8A, a light-blocking film 803 with a thickness of 0.1 mm is sandwiched between a transparent glass substrate 801 with a thickness of 1.2 mm and a pressure roller 802, and is stuck to the transparent glass substrate with pressure applied thereto while avoiding intrusion of bubbles therein. Next, as shown in the plan schematic view of FIG. 8B, die cutting and peeling of unnecessary potions of the light-blocking film in the openings are performed, and then, the film is cut into individual optical filters. The width of each opening 703 is set narrower than the measurement scan width to prevent damage to the measurement target due to excessive light exposure.

Figure 9:
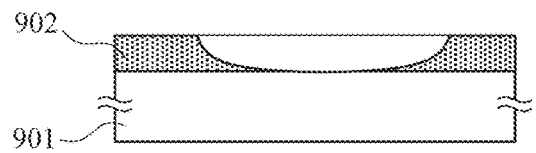
FIG. 9 is a cross-sectional schematic view showing an exemplary structure of an optical filter.

FIG. 9 is a cross-sectional schematic view showing another exemplary structure of the optical filter 308. The optical filter has a structure in which a light-blocking material 902 is formed on a transparent substrate 901 such that the light-blocking material 902 has a continuous thickness gradient.

Figure 10A:
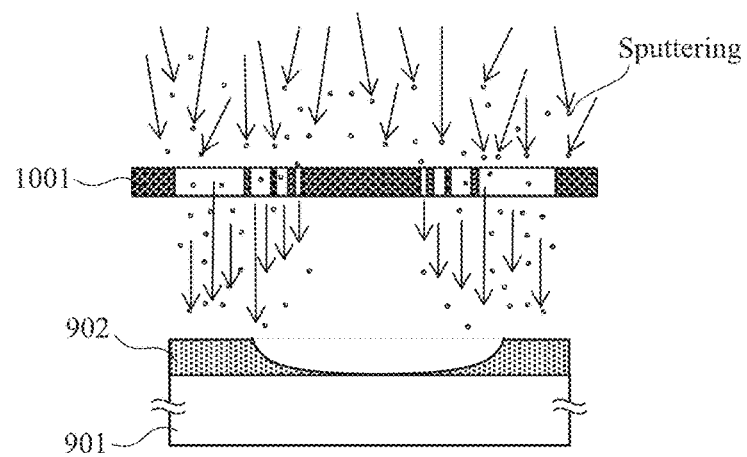
FIGS. 10A and 10B are schematic views each illustrating a method for producing an optical filter.
Figure 10B:
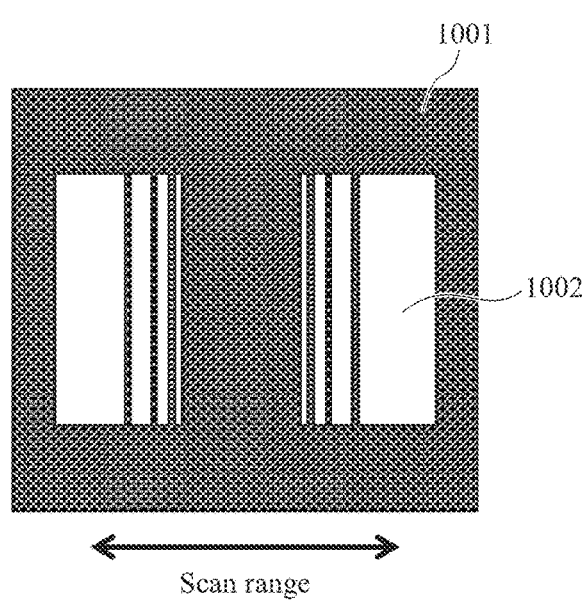

FIGS. 10A and 10B are schematic views each illustrating a method for producing the optical filter shown in FIG. 9. FIG. 10A is a schematic view of a film deposited by sputtering, and FIG. 10B is a plan schematic view of a metal mask used for the sputtering. A metal mask 1001 with an opening region 1002 is arranged above the transparent glass substrate 901 of 15 mm×15 mm square and 1.2 mm thick at a position away from the substrate by 10 mm, and Al is deposited to a thickness of 100 nm by sputtering as the light-blocking material 902. As the metal mask 1001 is provided with the opening region 1002 having openings with different sizes, it is possible to provide a change in the thickness of the film in accordance with the sizes of the openings of the opening region 1002.

Figure 11:
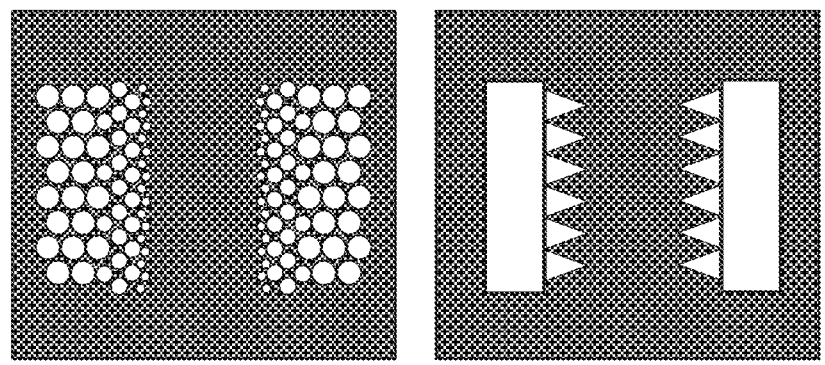
FIG. 11 is a schematic view showing an example of a metal mask used for producing an optical filter.

As a method for depositing a film, not only sputtering, but also vapor deposition, CVD, or the like can be used. The region of the openings, the shapes of the openings, and the arrangement of the metal mask may be adjusted in accordance with a film deposition apparatus used. The shapes of the openings of the metal mask may be any of the shapes shown in FIG. 11 or a combination thereof. As the light-blocking material, not only Al, but also Cr, Mo, Co, Ti, Ni, W, Ta, Pt, Au, or an alloy containing them may be used. It is acceptable as long as a material is used that has a sufficient light-blocking effect with respect to the wavelength used. According to such a method, a light-blocking effect can be obtained with a film as thin as about 100 nm.

Figure 12:
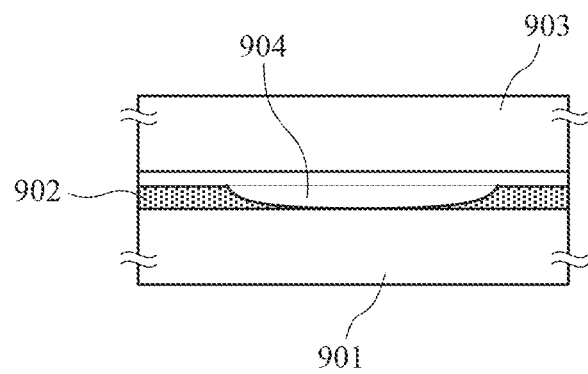
FIG. 12 is a cross-sectional schematic view showing an exemplary structure of an optical filter.

In addition, as shown in the cross-sectional schematic view of FIG. 12, a multi-layer structure may also be used in which a thin film of the light-blocking material 902 that is formed on the transparent glass substrate 901 is further covered with a transparent substrate 903 for protection purposes. In such a case, the light-blocking effect remains unchanged. The transparent substrate 903 is fixed to the transparent glass substrate 901 with an adhesive 904.

As the transparent substrate, not only a glass substrate, but also a plastic substrate of acrylic, polycarbonate, or polyolefin; a Si substrate, or the like can also be used. It is acceptable as long as a substrate is used that has sufficient transmissivity with respect to the wavelength used.

Figure 13A:
FIGS. 13A and 13B are cross-sectional schematic views each showing an example of an optical filter.

FIG. 13A is a cross-sectional schematic view of a sheet-like optical filter 1301 as another example of the optical filter. The sheet has a uniform thickness, and has transmissivity that changes in accordance with the concentration gradient of a light-blocking material that fills the sheet.

Figure 14A:
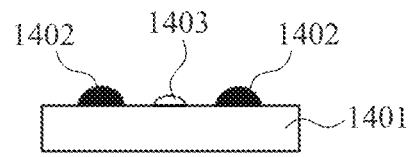
FIGS. 14A to 14F are cross-sectional schematic views showing an example of a method for producing a sheet-like optical filter.
Figure 14B:
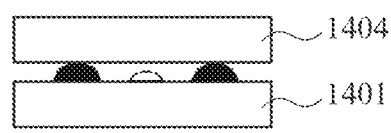
Figure 14C:
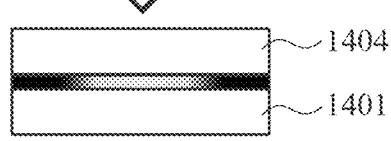
Figure 14D:
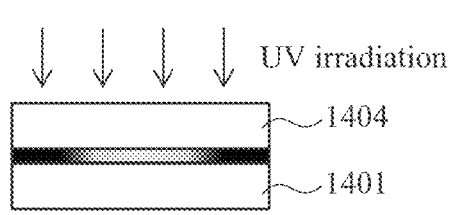
Figure 14E:
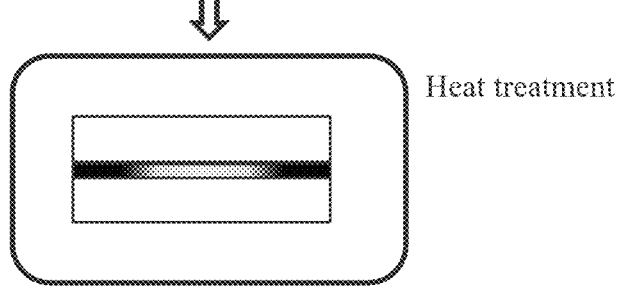
Figure 14F:

FIGS. 14A to 14F are cross-sectional schematic views showing an example of a method for producing the sheet-like optical filter shown in FIG. 13A. 0.5 cc resin 1402 containing a light-blocking material is applied onto each opposite end side of a glass substrate 1401 of 15 mm×15 mm square, and 0.1 cc transparent resin 1403 without a light-blocking material is applied onto the central portion of the substrate (FIG. 14A). After that, a transparent holding member 1404 is laid over the substrate (FIG. 14B), and pressure is applied thereto to obtain a uniform thickness (FIG. 14C). After that, UV irradiation of 200 mJ/cm$^2$ (FIG. 14D) and heat treatment at 80° C. for 20 minutes (FIG. 14E) are performed to completely cure the rein. If the content of the light-blocking material is high, it is impossible to completely cure the resin only through UV irradiation. Thus, UV curable epoxy resin (produced by Hitachi Chemical Company, Ltd.) that can be cured in two stages, that is, photo-cured and thermally cured is used to utilize the temporary fixing effect. After that, the glass substrate 1401 and the transparent holding member 1404 are peeled away to complete the sheet-like optical filter 1301 (FIG. 14F).

The boundary between two liquids with different contents of a light-blocking material will have a gradation in accordance with a change in the concentration of the light-blocking material such that the light transmissivity becomes lower in the outer portion where the concentration of the light-blocking material is higher and the light transmissivity becomes higher in the central portion where the concentration of the light-blocking material is lower. The dropped positions and the applied amounts of the resin containing a light-blocking material and the transparent resin are adjusted so that the light-blocking region and the light-transmissive region are located within predetermined ranges.

Figure 13B:
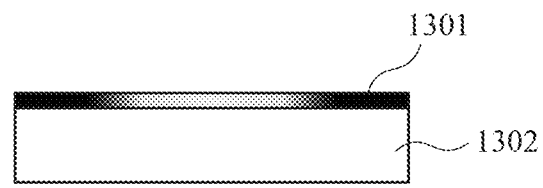

It should be noted that the sheet-like optical filter 1301 may also be used while being attached to a transparent substrate 1302 as shown in FIG. 13B. Accordingly, it becomes possible to suppress the generation of aberrations due to deformation of the sheet-like optical filter (or thin film). Further, if the sheet-like optical filter is removably attached to the transparent substrate 1302, it becomes possible to easily replace the sheet-like optical filter by removing it from the transparent substrate 1302 when it becomes dirty upon contact with a sample, for example.

If the sheet-like optical filter is replaced, there is a possibility that the position of the new filter may differ from that before replacement. Therefore, the drive range of the galvanometer mirror 306, which is a scanning element, should be corrected. Hereinafter, an example of the correction method will be described. A mirror with uniform reflectivity is arranged at the position of the measurement target 309, and a signal beam is focused onto the mirror surface by the objective lens 307, and further, the focus position is moved by the galvanometer mirror 306, so that the transmissivity distribution of the optical filter in the scanning range is measured based on electric signals detected by the spectroscope 315. Based on the measurement results, a deviation between the center position of the sheet-like optical filter and the center position of the scanning range is calculated. Then, offsetting the center position of the repeated scanning of the galvanometer mirror 306 so as to correct the positional deviation can allow the center position of the sheet-like optical filter to coincide with the center position of the scanning range and thus can allow for the correction of a positional deviation that occurs upon replacement of the sheet-like optical filter.

Embodiment 2

Figure 15:
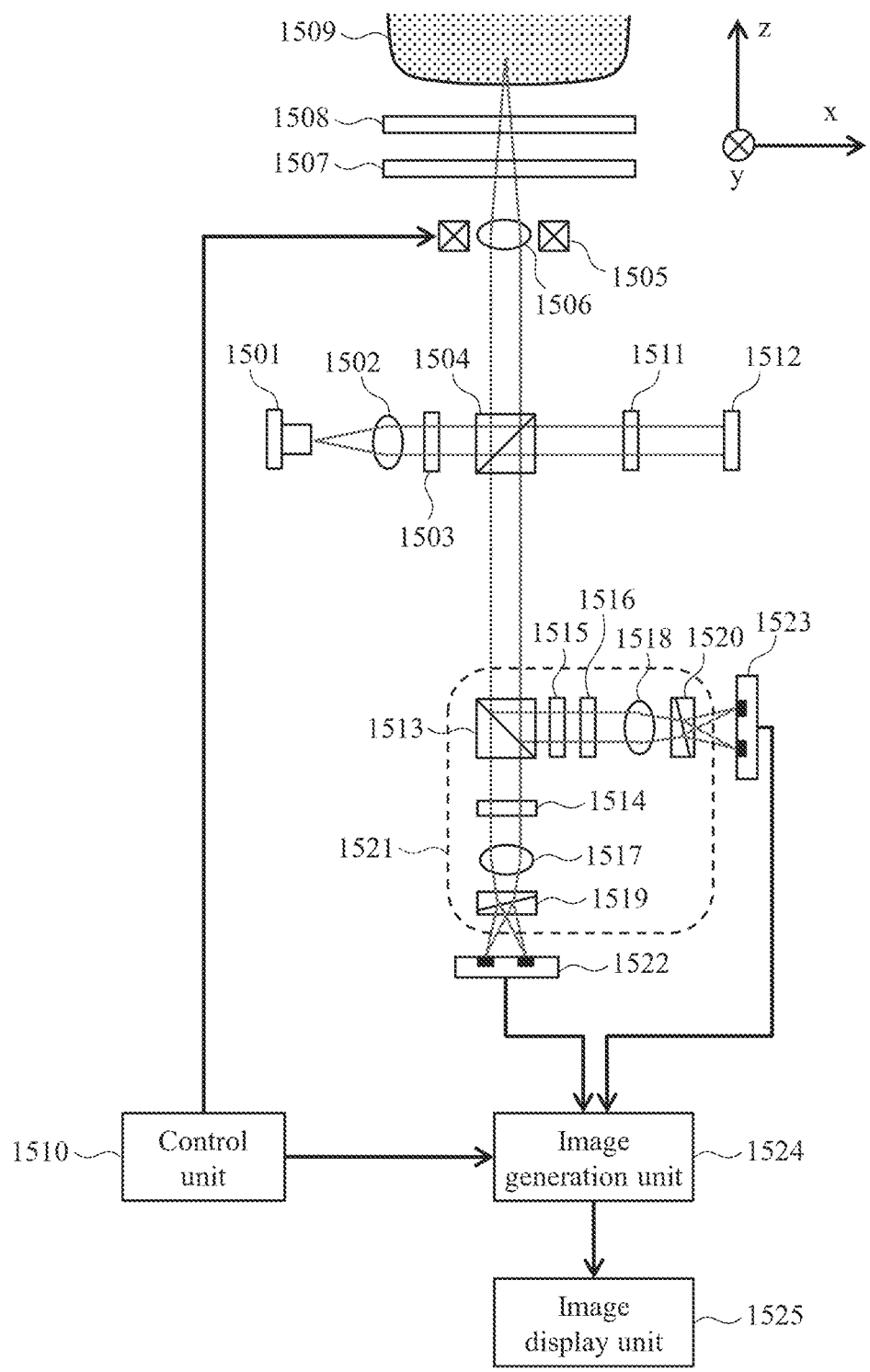
FIG. 15 is a schematic view showing an exemplary configuration of an optical measuring device.

FIG. 15 is a schematic view showing another exemplary configuration of the optical measuring device in accordance with the present invention.

Laser beams emitted from a light source 1501 are converted into collimated beams by a collimating lens 1502. Then, the polarizations of the beams are rotated by a λ/2 plate 1503 whose optical axis direction is adjustable, and then, the beams are each split into a signal beam and a reference beam by a polarization beam splitter 1504. The signal beam is focused by an objective lens 1506 mounted on an actuator 1505, and passes through an optical filter 1507 and a λ/4 plate 1508 whose optical axis direction is set at about 22.5 degrees with respect to the horizontal direction, and then irradiates a measurement target 1509. At this time, the power of the signal beam that irradiates the measurement target is adjusted to an appropriate value in accordance with the focus position as the signal beam passes through the optical filter 1507. In addition, the signal beam is converted from a p-polarized beam into a circularly polarized beam by passing through the λ/4 plate 1508.

Figure 1:
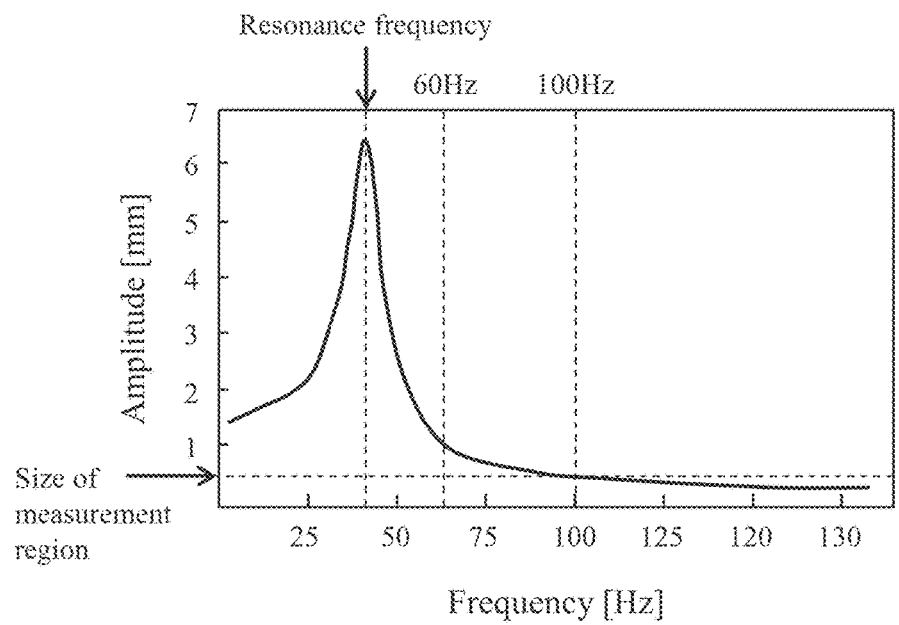
FIG. 1 is a chart showing the typical frequency characteristics of the drive amplitude of an actuator.
Figure 2:
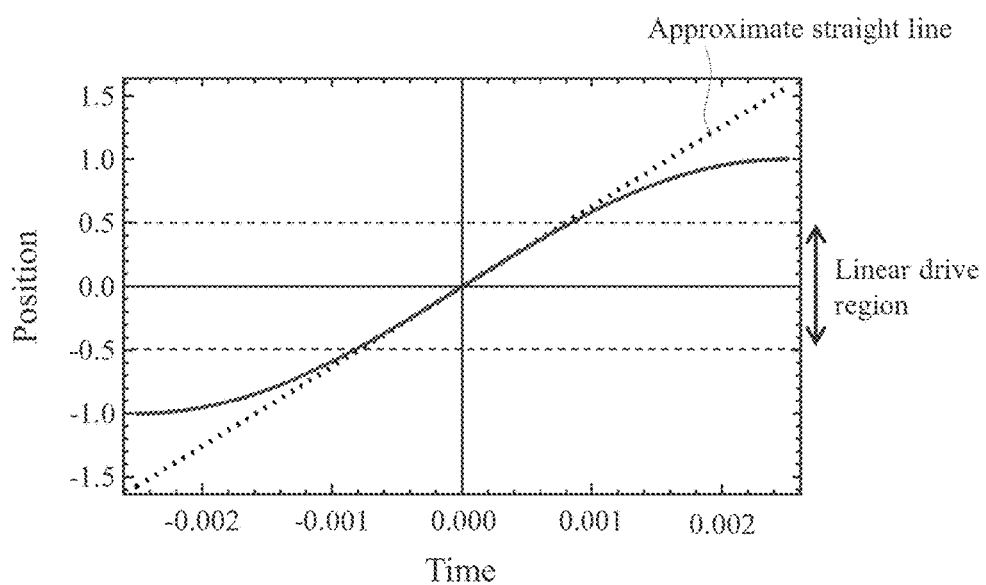
FIG. 2 is a chart showing an example of the relationship between a time and the position when the actuator is driven.

The objective lens 1506 is repeatedly moved at least in the x-direction by the actuator 1505 under the control of a control unit 1510, and is displaced in the y-direction or the z-direction. Accordingly, the focus position (i.e., the measurement position) of the signal beam is moved by the objective lens 1506. Herein, the frequency characteristics of the actuator 1505 are identical to those shown in FIG. 1, and the frequency of the repeated scanning in the x-direction of the actuator 1505 is higher than the resonance frequency of the actuator 1505. The signal beam reflected or scattered by the measurement target 1509 is converted from the circularly polarized state into a p-polarized state by the λ/4 plate 1508, and passes through the optical filter 1507, and is then converted into collimated beams by the objective lens 1506, so that the beams become incident on the polarization beam splitter 1504. At this time, the optical filter 1507 passes the signal beam reflected or scattered by the measurement target with almost no attenuation.

Meanwhile, the reference beam passes through the λ/4 plate 1511 to be converted from a p-polarized state into a circularly polarized state, and is reflected by a mirror 1512, and is then converted from the circularly polarized state into a s-polarized state, and becomes incident on the polarization beam splitter 1504.

The signal beam and the reference beam are combined by the polarization beam splitter 1504, whereby a combined beam is generated. The combined beam is guided to interference optics 1521 that include a half beam splitter 1513, λ/2 plates 1514 and 1516, a λ/4 plate 1515, condensing lenses 1517 and 1518, and Wollaston prisms 1519 and 1520.

The combined beam that enters the interference optics 1521 is split into a transmitted beam and a reflected beam by the half beam splitter 1513. The transmitted beam passes through the λ/2 plate 1514 whose optical axis is set at about 22.5 degrees with respect to the horizontal direction, and is focused by the condensing lens 1517, and is further split in two by the Wollaston prism 1519, whereby a first interference beam and a second interference beam that are out of phase with each other by 180° is generated. The first interference beam and the second interference beam are detected by a current differential photodetector 1522, so that an electric signal that is proportional to the intensity difference between the two beams is output.

Meanwhile, the reflected beam passes through the λ/4 plate 1515 whose optical axis is set substantially along the horizontal direction and further through the λ/2 plate 1516 whose optical axis is set at about 22.5 degrees with respect to the horizontal direction, and is focused by the condensing lens 1518, and is then split in two by the Wollaston prism 1520, whereby a third interference beam and a fourth interference beam that are out of phase with each other by 180 degrees are generated. The third interference beam and the fourth interference beam are detected by a current differential photodetector 1523, and an electric signal that is proportional to the intensity difference between the two beams is output. The electric signals output from the photodetectors 1522 and 1523 are sent to an image generation unit 1524, so that the image generation unit 1524 generates an image based on the electric signals and displays the image on an image display unit 1525. The actuator 1505 and the image generation unit 1524 are controlled by the control unit 1510.

Hereinafter, the aforementioned operation principle will be described using mathematical formulae. Provided that the Jones vector of the combined beam at a time point when it enters the interference optics 1521 is represented as follows:

$$\begin{pmatrix} E_{sig} \\ E_{ref} \end{pmatrix}$$ [Formula 8]

the Jones vector of the combined beam that has passed through the half beam splitter 1513 and further through the λ/2 plate 1514 is represented as follows. Herein, $E_{sig}$ is the complex number of the signal beam, and $E_{ref}$ is the complex number of the reference beam.

[Formula 9]

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} E_{sig} - E_{ref} \\ E_{sig} + E_{ref} \end{pmatrix}$$ [Formula 9]

The combined beam represented by Formula 9 is split into p-polarized components and s-polarized components by the Wollaston prism 1519, which are then differentially detected by the current differential photodetector 1522. An electric signal output from the photodetector 1522 at this time is represented as follows.

$$I = \frac{1}{4}|E_{sig} + E_{ref}|^2 - \frac{1}{4}|E_{sig} - E_{ref}|^2 =$$ [Formula 10]

$$|E_{sig}||E_{ref}|\cos(\theta_{sig} - \theta_{ref})$$

Herein, $\theta_{sig}$ and $\theta_{ref}$ are the phases when the complex numbers $E_{sig}$ and $E_{ref}$ are represented in polar coordinates, respectively. The conversion efficiency of the detector is set to 1 for the sake of simplicity.

Meanwhile, the Jones vector of the combined beam that has been reflected by the half beam splitter 1513 and has passed through the λ/4 plate 1515 and the λ/2 plate 1516 is represented as follows.

$$\begin{pmatrix} i/\sqrt{2} & 1/\sqrt{2} \\ 1/\sqrt{2} & i/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} i(E_{sig} - iE_{ref}) \\ E_{sig} + iE_{ref} \end{pmatrix}$$ [Formula 11]

The combined beam represented by Formula 11 is split into p-polarized components and s-polarized components by the Wollaston prism 1520, which are then differentially detected by the current differential photodetector 1523. An electric signal output from the photodetector 1523 at this time is represented as follows.

$$Q = \frac{1}{4}|E_{sig} + iE_{ref}|^2 - \frac{1}{4}|E_{sig} - iE_{ref}|^2 =$$ [Formula 12]

$$|E_{sig}||E_{ref}|\sin(\theta_{sig} - \theta_{ref})$$

The image generation unit 1524 performs the following operation on the signals represented by Formula 10 and Formula 12, thereby generating a signal that is independent of the phase and is proportional to the absolute value of the amplitude of the signal beam.

$$|E_{sig}||E_{ref}| = \sqrt{I^2 + Q^2}$$ [Formula 13]

Hereinafter, the role and the transmissivity distribution of the optical filter 1507 will be described. The optical filter 1507 in this embodiment is transparent to the signal beam in the p-polarized state that has been reflected or scattered by the measurement target 1509 and has passed through the λ/4 plate 1508, and has, with respect to the signal beam in the s-polarized state that has not become incident on the measurement target 1509 yet, uniform transmissivity in the y-direction and lower transmissivity in the peripheral portion than in the central portion of the filter in the x-direction. Accordingly, it is possible to reduce the exposure amount in a region around a return position of repeated scanning where the scanning speed becomes slow, and thus suppress damage to the measurement target. Further, as the optical filter 1507 is transparent to the signal beam reflected or scattered by the measurement target, it is possible to avoid unwanted attenuation of the signal beam.

In this embodiment, the optical filter 1507 is provided with a transmissivity distribution represented by the following formula as an example. That is, the optical filter 1507 is provided with a transmissivity distribution that is proportional to the square root of the moving speed $dx(t)/dt$ of the focus position of the signal beam.

$$T(x) = \begin{cases} \left(\frac{|dx(t)/dt|}{dx(0)/dt}\right)^{1/2} = |\cos(2\pi f_x t)|^{1/2} = \\ \qquad \left|1 - \left(\frac{2}{A}x\right)^2\right|^{1/4} & (|x| < x_c) \\ 0 & (|x| > x_c) \end{cases}$$ 
[Formula 14]

Figure 16:
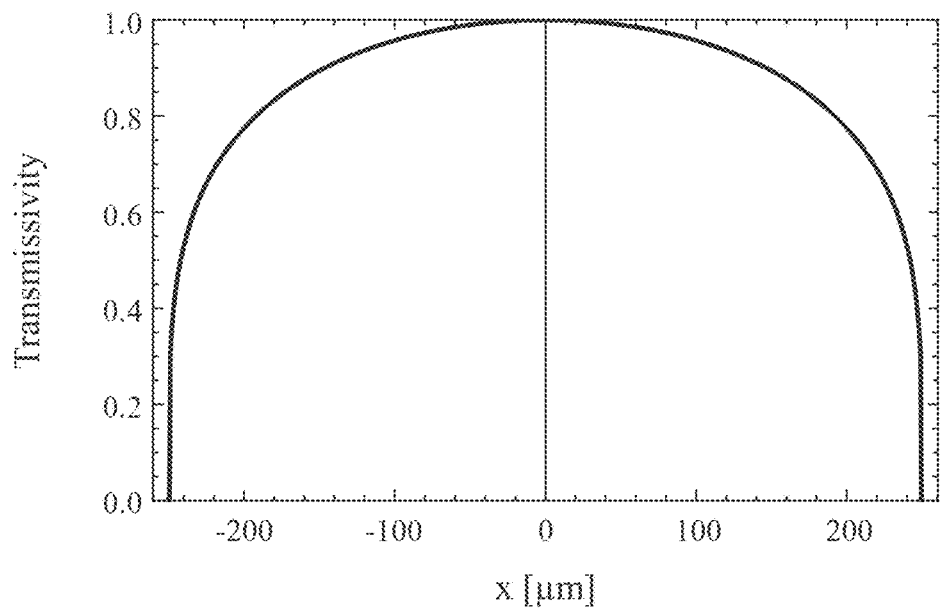
FIG. 16 is a view showing an example of the transmissivity distribution of an optical filter.
Figure 17:
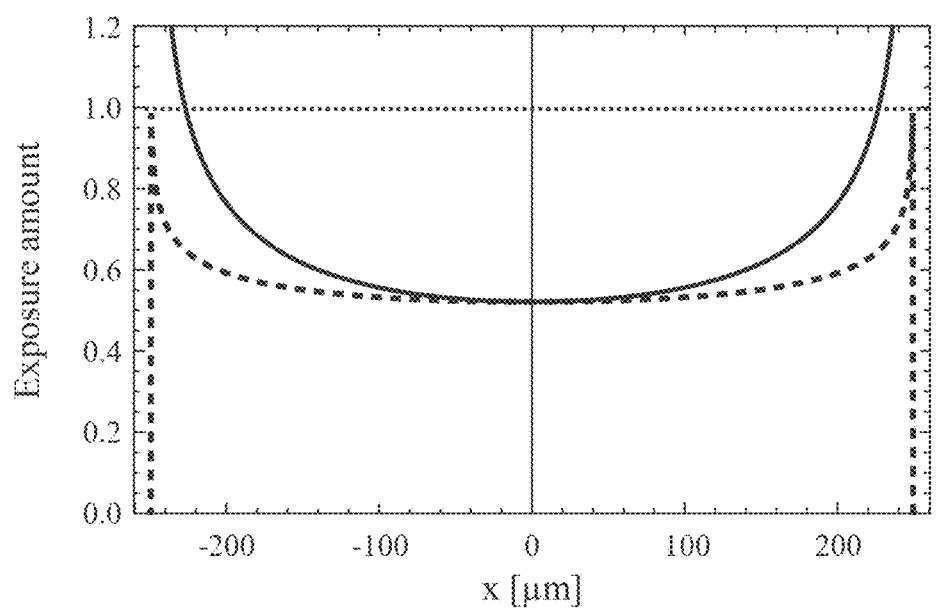
FIG. 17 is a view showing an example of the exposure amount distribution of a measurement target.

Herein, $x_c$ is the position where the exposure amount coincides with the MPE when an optical filter is used whose transmissivity for all x is given by T(x) of Formula 4 where $x < x_c$. FIG. 16 shows the transmissivity distribution of Formula 14. FIG. 17 shows the spatial distribution of the exposure amount when the optical filter 1507 is not used (solid line) and when the optical filter 1507 with the transmissivity distribution represented by Formula 14 is used (dashed line). The values of parameters used for the calculation are the same as those in the first embodiment. When the optical filter 1507 is used, the exposure amount is below the MPE in all regions. In addition, the measurement possible region (i.e., a region where the exposure amount is less than or equal to the MPE and the transmissivity of the filter is greater than or equal to zero) is expanded from about 454 μm to about 499 μm with the application of the optical filter 1507.

As another example of the transmissivity distribution provided to the optical filter 1507, a transmissivity distribution represented by the following formula is considered.

$$T(x) = \begin{cases} \left(\frac{|dx(t)/dt|}{dx(0)/dt}\right)^{1/2} = |\cos(2\pi f_x t)|^{1/2} = \\ \qquad \left|1 - \left(\frac{2}{A}x\right)^2\right|^{1/4} & (|x| < x'_c) \\ 0 & (|x| > x'_c) \end{cases}$$ 
[Formula 15]

Figure 18:
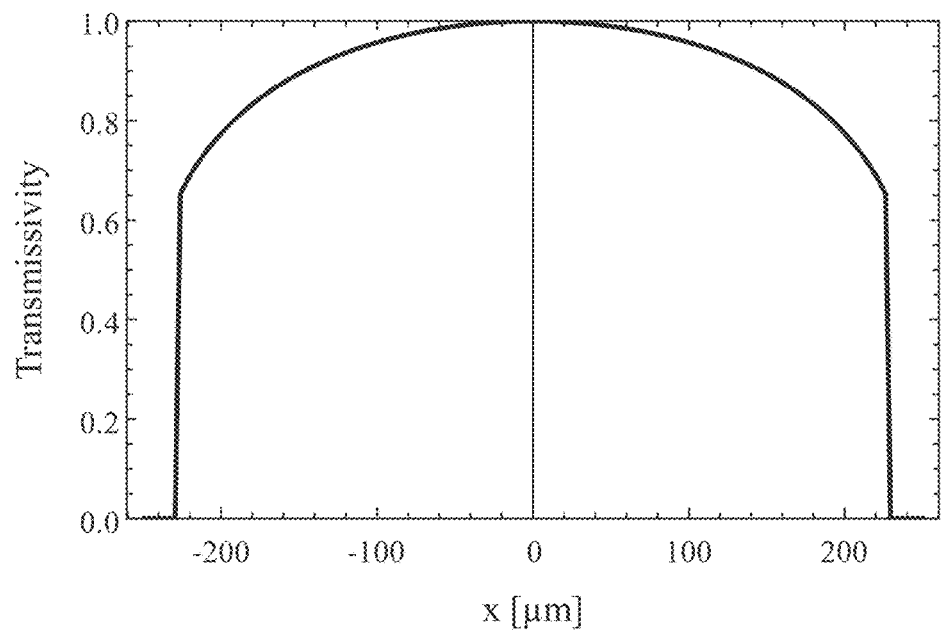
FIG. 18 is a view showing an example of the transmissivity distribution of an optical filter.
Figure 19:
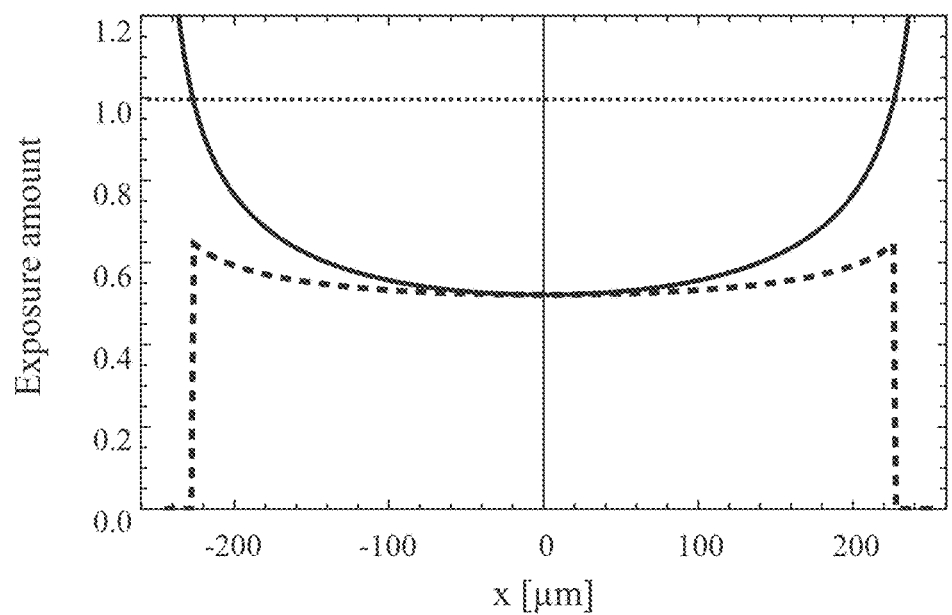
FIG. 19 is a view showing an example of the exposure amount distribution of a measurement target.

Herein, $x'_c$ is the position where the exposure amount coincides with the MPE when the optical filter 1507 is not used. FIG. 18 shows the transmissivity distribution of Formula 15. FIG. 19 shows the spatial distribution of the exposure amount when the optical filter 1507 is not used (solid line) and when the optical filter 1507 with the transmissivity distribution represented by Formula 15 is used (dashed line). In such a case, the exposure amount becomes far smaller than the MPE in the entire region with the application of the optical filter 1507. Thus, it is possible to further increase the irradiation power (by 1.54 times at the maximum in the case of FIG. 19), and thus improve the S/N ratio of a signal across the entire measurement region.

Next, the S/N ratio of a signal of each pixel of a tomographic image that is obtained in this embodiment will be described. The number of samplings ($N_{sampling}$) of data per pixel of an image is represented by Formula 5 in the first embodiment. The S/N ratio of a signal of each pixel is given by the following formula.

$$SNR(x) = \alpha T(x) \sqrt{N_{sampling}(x)}$$ 
[Formula 16]

Herein, α is a coefficient of proportionality. This embodiment differs from the first embodiment in that the S/N ratio is proportional to not the square but the first power of T(x). From Formula 16, it is seen that when T(x) is a constant (i.e., when the optical filter 1507 is not used), the S/N ratio of a signal of each pixel of an image differs depending on the position x of the pixel, and thus has a distribution. Substituting Formula 14 (or Formula 15) and Formula 5 into Formula 16 can obtain the S/N ratio of a signal of each pixel when the optical filter 1507 is used.

$$SNR(x) = \alpha \left(\frac{|dx(t)/dt|}{dx(0)/dt}\right)^{1/2} \left(f_{sampling} \frac{L_{pixel}}{|dx(t)/dt|}\right)^{1/2} = \alpha \left(f_{sampling} \frac{L_{pixel}}{\pi A f_x}\right)^{1/2}$$ 
[Formula 17]

From Formula 17, it is seen that as in the first embodiment, due to the effect of the transmissivity distribution provided to the optical filter 1507, the S/N ratio of a signal of each pixel becomes constant regardless of the position of the pixel. Accordingly, in this embodiment, the sharpness of the structure of the imaged measurement target becomes constant in any region of the image, and thus, an image that correctly reflects the structure of the measurement target can be obtained.

Although the optical filter 1507 whose transmissivity is given by Formula 14 or Formula 15 is used in this embodiment, similar effects can be obtained as long as a filter is used that has lower transmissivity in its peripheral portion than in its central portion. Thus, this embodiment should not be limited to an optical measuring device having the optical filter 1507 with the transmissivity distribution represented by Formula 14 or Formula 15.

In addition, although the focus position of a signal beam is moved at least in two directions by the actuator 1505 in this embodiment, it is also possible to use a different scanning element. For example, it is possible to use a method of moving the entire portion other than the control unit 1510, the image generation unit 1524, and the image display unit 1525 of the optical measuring device with respect to a measurement target using a motor and the like.

Finally, an exemplary structure of the optical filter 1507 will be described. As described above, the optical filter 1507 is transparent to a p-polarized light beam, and has, with respect to a s-polarized light beam, uniform transmissivity in the y-direction and lower transmissivity in the peripheral portion than in the central portion of the filter in the x-direction. As a filter with such a function, there is known a machined wire grid polarizer such as the one described in Patent Document 4, for example.

Figure 20A:
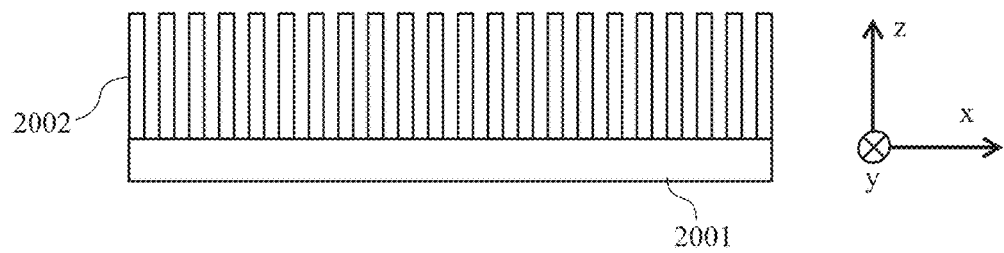
FIGS. 20A and 20B are cross-sectional schematic views showing an example of a method for producing an optical filter.
Figure 20B:
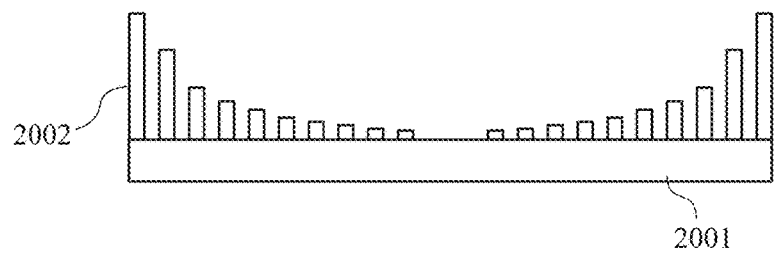

FIGS. 20A and 20B are cross-sectional schematic views showing an example of a method for producing the optical filter 1507. A wire grid polarizer shown in FIG. 20A has a structure in which elements that are elongated in the y-direction (referred to as wires herein) 2002 are arranged on a transparent substrate 2001, and has a transmissivity of substantially zero with respect to a linearly polarized light beam that oscillates in the y-direction (i.e., a s-polarized light beam), and has a transmissivity of substantially 1 with respect to a linearly polarized light beam that oscillates in the x-direction (i.e., a p-polarized light beam). Such a wire grid polarizer is machined such that the heights of the wires gradually become shorter from the peripheral portion toward the central portion as shown in FIG. 20B. Accordingly, the optical filter 1507 is obtained that is transparent to a p-polarized light beam and has, with respect to a s-polarized light beam, uniform transmissivity in the y-direction and lower transmissivity in the peripheral portion than in the central portion of the filter in the x-direction. Besides, similar effects are also obtained by gradually increasing the pitch of the wires from the peripheral portion toward the central portion of the filter, for example.

Although the optical filter 1507 and the λ/4 plate 1508 are provided separately in this embodiment, such components may also be integrated by, for example, attaching the λ/4 plate to the rear surface of the substrate of the optical filter 1507 shown in FIG. 20B, for example.

Embodiment 3

Figure 21:
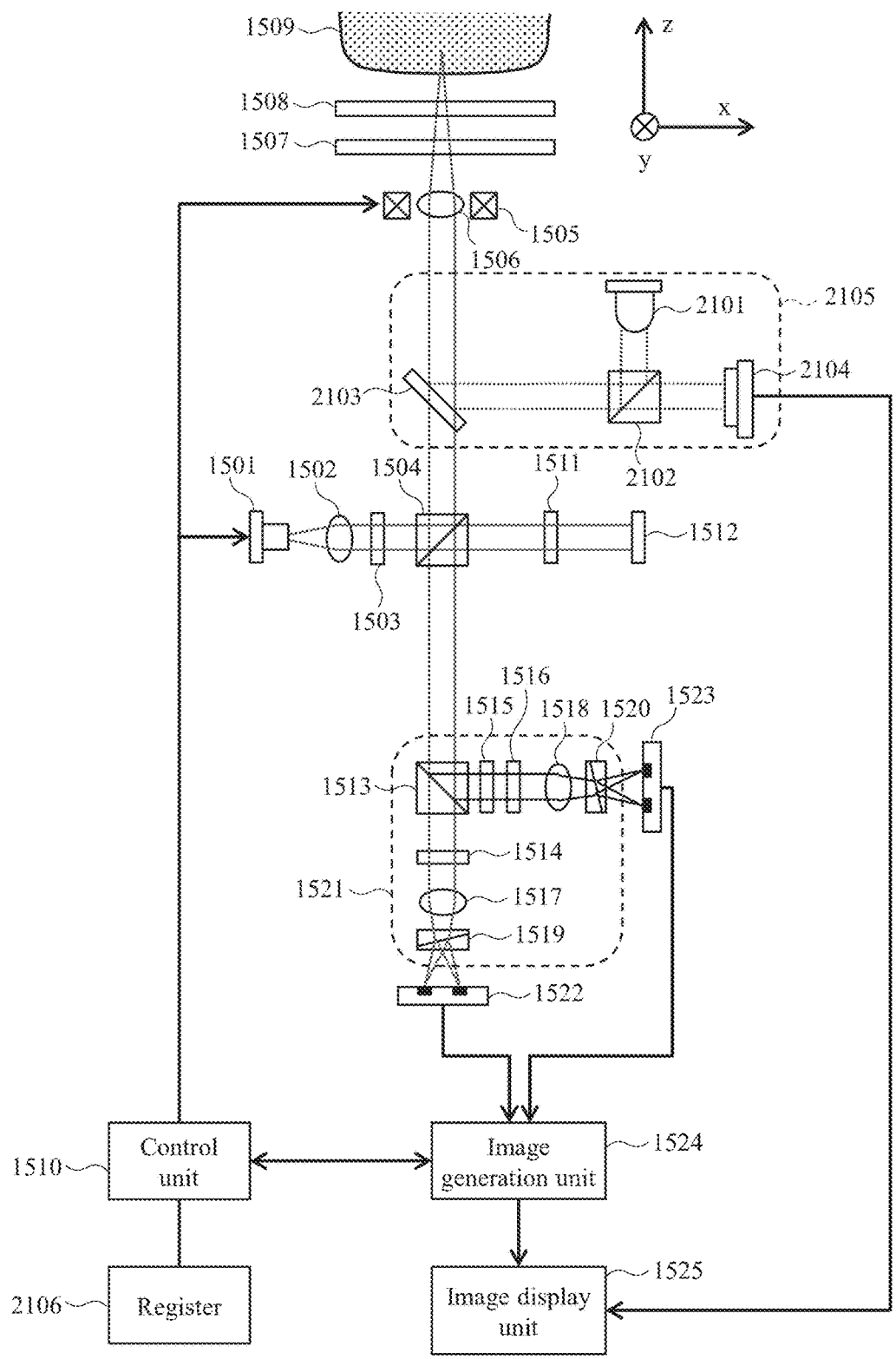
FIG. 21 is a schematic view showing an exemplary configuration of an optical measuring device.

FIG. 21 is a schematic view showing another exemplary configuration of the optical measuring device in accordance with the present invention. It should be noted that the same components as those shown in FIG. 15 are denoted by the same reference numerals, and the descriptions thereof will be partly omitted. This embodiment differs from Embodiment 2 in that it has surface observation optics 2105 for observing the surface portion of the measurement target 1509, and a register 2106 that is a storage unit for storing the optimum power in accordance with the irradiation position of a signal beam and in that the power of the light source 1501 is controlled by the control unit 1510.

First, the function of the surface observation optics 2105 that include an illumination light source 2101, a beam splitter 2102, a dichroic mirror 2103, and an imaging device 2104 will be described. A part of an illumination beam emitted from the illumination light source 2101, which has a different wavelength from that of the light source 1501, is reflected by the beam splitter 2102 and the dichroic mirror 2103, and then reaches the measurement object 1509. Herein, the dichroic mirror 2103 passes the wavelength of a light beam emitted from the light source 1501, and reflects a light beam emitted from the illumination light source 2101. The illumination light beam reflected by the measurement target 1509 is again reflected by the dichroic mirror 2103, and partly passes through the beam splitter 2102, and is then detected by the imaging device 2104. The surface portion of the measurement target 1509 is imaged on the imaging device 2104, and the image display unit 1525 that has received a signal from the imaging device 2104 displays the surface image of the measurement target 1509. Accordingly, a user is able to select a measurement position for acquiring a tomographic image based on the observation results of the surface of the measurement target that is displayed on the image display unit 1525.

Next, the functions of the optical filter 1507, the register 2106, and the control unit 1510 will be described. For the transmissivity distribution of the optical filter 1507, the transmissivity distribution shown in Formula 14 of Embodiment 2 or the like is used. However, in practice, the transmissivity distribution of the optical filter 1507 may differ from the design value (Formula 14) due to variations or insufficient accuracy. Thus, in this embodiment, the transmissivity distribution of the optical filter 1507 is measured in advance. A deviation of the transmission distribution from the design value is compensated for based on the measurement results, and the light-emission power of the light source 1501 for obtaining an appropriate signal beam power at each position is stored in the register 2106. The control unit 1510 controls the light source 1501 based on the information stored in the register 2106, and adjusts the signal beam power at each position to an appropriate value.

Figure 22:
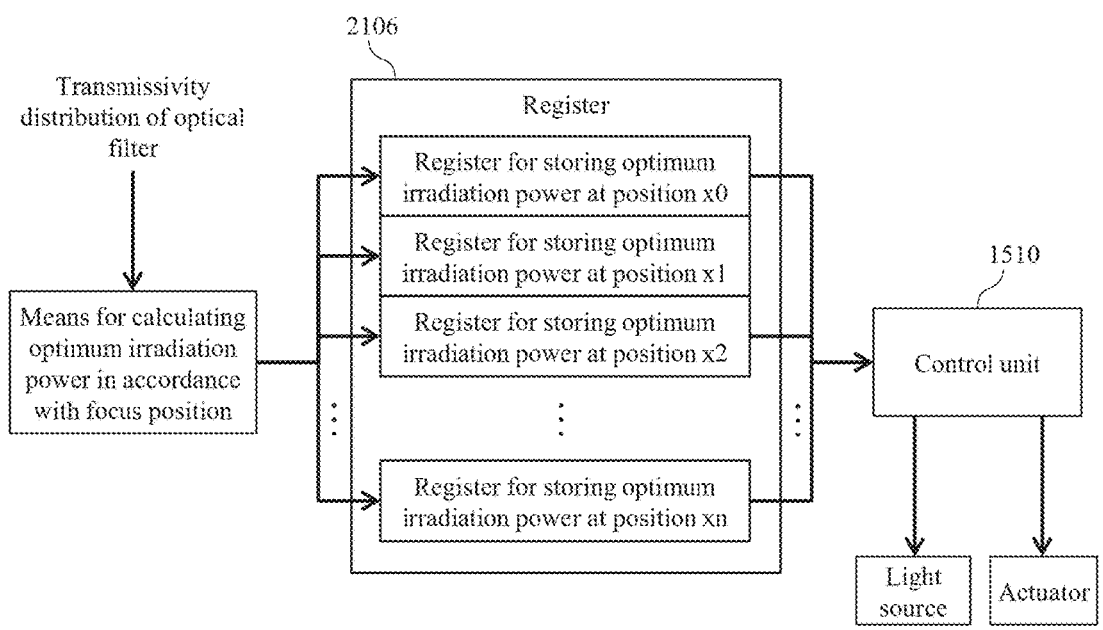
FIG. 22 is a block diagram showing an exemplary configuration of light-emission power control of a light source.

FIG. 22 is a block diagram showing an exemplary configuration of the light-emission power control of the light source. The transmissivity distribution of the optical filter 1507 can be calculated based on electric signals detected with the photodetectors 1522 and 1523 by, for example, arranging a mirror with uniform reflectivity at the position of the measurement target 1509, focusing a signal beam onto the mirror surface with the objective lens 1506, and moving the focus position in the x-direction with the actuator 1505.

The register 2106 stores the thus calculated optimum irradiation power of the light source at each position in the x-direction. As the signal beam power for the measurement target 1509 is roughly adjusted to an appropriate value by the optical filter 1507, the amount of the light-emission power of the light source 1501 that is controlled by the control unit 1510 can be suppressed than when the optical filter 1507 is not used. Accordingly, more stable, accurate control becomes possible than when the optical filter 1507 is not used. Thus, this embodiment can expand the measurement region or obtain a uniform S/N ratio of a signal of each pixel of an image using a simple configuration and method than the conventional ones while avoiding damage to the measurement target.

It should be noted that the present invention is not limited to the aforementioned embodiments, and includes a variety of variations. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

DESCRIPTION OF SYMBOLS

1501 Light source
1502 Collimating lens
1503, 1514, 1516 λ/2 plate
1504 Polarization beam splitter
1505 Actuator
1506 Objective lens
1507 Optical filter
1508, 1511, 1515 λ/4 plate
1509 Measurement target
1510 Control unit
1513 Half beam splitter
1517, 1518 Condensing lens
1519, 1520 Wollaston prism 1521 Interference optics
1522, 1523 Current differential photodetector
1524 Image generation unit
1525 Image display unit

What is claimed is:

1. An optical measuring device comprising:
    a light source;
    an optical splitting unit configured to split a light beam emitted from the light source into a signal beam and a reference beam;
    irradiation optics configured to irradiate a measurement target with the signal beam;
    a scanning unit configured to repeatedly move a focus position of the signal beam on the measurement target;
    interference optics configured to combine the reference beam with the signal beam reflected or scattered by the measurement target, thereby generating interference beams; and
    photodetectors configured to detect the respective interference beams, wherein
    the irradiation optics have arranged therein an optical element, the optical element having lower transmissivity in its peripheral portion than in its central portion.

2. The optical measuring device according to claim 1, wherein
    the irradiation optics include an objective lens configured to focus the signal beam onto the measurement target, and
    the scanning unit includes a first drive unit and a second drive unit, the first drive unit being configured to drive the objective lens in an optical axis direction of the signal beam, and the second drive unit being configured to drive the objective lens in a direction substantially perpendicular to the optical axis direction of the signal beam.

3. The optical measuring device according to claim 2, wherein a drive frequency of the second drive unit is higher than a resonance frequency of the scanning unit.

4. The optical measuring device according to claim 1, wherein the transmissivity of the optical element becomes gradually higher at positions closer to the central portion from the peripheral portion.

5. The optical measuring device according to claim 1, wherein the transmissivity of the optical element at a position where the signal beam is passed is proportional to a square root or a fourth root of a moving speed of the focus position of the signal beam moved by the scanning unit at the position where the signal beam is passed.

6. The optical measuring device according to claim 1, wherein the optical element includes a transparent substrate and a light-blocking portion, the light-blocking portion being provided at least on an end portion of the transparent substrate.

7. The optical measuring device according to claim 1, wherein the optical element includes a transparent substrate and a light-blocking material formed on the transparent substrate, the light-blocking material having a continuous thickness gradient.

8. The optical measuring device according to claim 1, wherein the optical element includes a light-blocking material, and a concentration of the light-blocking material has a spatial distribution.

9. The optical measuring device according to claim 1, wherein the optical element includes a transparent flat plate and a thin film removably attached to the flat plate, the thin film having higher transmissivity in its central portion than in its peripheral portion.

10. The optical measuring device according to claim 1, wherein the optical element has lower transmissivity in its peripheral portion than in its central portion with respect to a signal beam that has not irradiated the measurement target yet, and is transparent to a signal beam that has been reflected or scattered by the measurement target.

11. The optical measuring device according to claim 1, wherein the optical element is transparent to a linearly polarized light beam at a particular angle, and has higher transmissivity in its central portion than in its peripheral portion with respect to a linearly polarized light beam that is perpendicular to the linearly polarized light beam at the particular angle.

12. The optical measuring device according to claim 1, wherein the optical element is arranged at a position in contact with the measurement target.

13. The optical measuring device according to claim 1, further comprising:
    a storage unit configured to store light-emission power of the light source in accordance with an irradiation position of the signal beam; and
    a control unit configured to control the light-emission power of the light source based on information stored in the storage unit.

14. The optical measuring device according to claim 1, further comprising:
    an image generation unit configured to generate an image based on a signal from the photodetector;
    an image display unit configured to display the generated image; and
    a control unit configured to control the scanning unit.

15. The optical measuring device according to claim 1, further comprising an imaging device configured to observe a surface of the measurement target.

* * * * *